(12) United States Patent
Duenas et al.

(10) Patent No.: US 11,868,225 B2
(45) Date of Patent: Jan. 9, 2024

(54) PROVIDED INPUTS AND PROVIDED OUTPUT ACTIONS FOR USE IN PLATFORM MANAGEMENT POLICIES FOR PLATFORM MANAGEMENT DRIVERS

(71) Applicant: ATI Technologies ULC, Markham (CA)

(72) Inventors: Alexander Sabino Duenas, Toronto (CA); Ashwini Chandrashekhara Holla, Toronto (CA); I-Cheng Chen, Toronto (CA); Xinzhe Li, Toronto (CA)

(73) Assignee: ATI Technologies ULC, Markham (CA)

( * ) Notice: Subject to any disclaimer, the term of this patent is extended or adjusted under 35 U.S.C. 154(b) by 40 days.

(21) Appl. No.: 17/561,111

(22) Filed: Dec. 23, 2021

(65) Prior Publication Data

US 2023/0205658 A1    Jun. 29, 2023

(51) Int. Cl.
*G06F 11/30* (2006.01)
*G06F 9/4401* (2018.01)

(52) U.S. Cl.
CPC ........ *G06F 11/3051* (2013.01); *G06F 9/4401* (2013.01); *G06F 11/3017* (2013.01)

(58) Field of Classification Search
CPC .......... G06F 3/048; G06F 21/604; H04L 41/00
See application file for complete search history.

(56) References Cited

U.S. PATENT DOCUMENTS

| | | | |
|---|---|---|---|
| 2003/0055955 A1* | 3/2003 | Cheng | H04L 41/00 709/224 |
| 2013/0281077 A1* | 10/2013 | Zou | H04W 4/50 455/418 |
| 2017/0031692 A1* | 2/2017 | Oh | G06F 21/604 |
| 2019/0215343 A1* | 7/2019 | Rykowski | G06F 3/048 |
| 2019/0215380 A1* | 7/2019 | Rykowski | G06F 3/048 |

* cited by examiner

*Primary Examiner* — Getente A Yimer
(74) *Attorney, Agent, or Firm* — Park, Vaughan, Fleming & Dowler LLP

(57) ABSTRACT

An electronic device includes a memory and a processor. The processor receives a platform management profile that includes information defining one or more platform management policies, a given platform management policy among the one or more platform management policies including a provided input from a specified hardware or software sensor and/or a provided output action. The processor uses the given platform management policy for controlling operating states of elements in the electronic device.

18 Claims, 6 Drawing Sheets

ELECTRONIC DEVICE 100

PROVIDED INPUTS AND PROVIDED OUTPUT ACTIONS FOR USE IN PLATFORM MANAGEMENT POLICIES FOR PLATFORM MANAGEMENT DRIVERS

BACKGROUND

Related Art

Some electronic devices include processors that execute program code (e.g., applications, operating systems, etc.) along with memories that store data for use by the processors. Many of such electronic devices also include other functional blocks and devices that are used for/when executing program code and/or for other purposes in the electronic devices (e.g., mass data storage devices, network interfaces, peripherals, human interfaces, etc.). For example, electronic devices such as desktop computers, laptop computers, and server computers often include processors and memories as well as other functional blocks and devices. Because processors, memories, and other functional blocks and devices in electronic devices generate heat during operation (e.g., due to Joule heating, etc.), the electronic devices include fans that circulate air through the electronic devices to prevent overheating. The electronic devices can also include one or more management units that control operating states of the processors, memories, and/or other functional blocks and devices so that the electronic devices provide a desired level of performance (e.g., are adequately responsive to user inputs, etc.) while avoiding unnecessary consumption of electrical power and the associated generation of heat. For example, the management units can place processors and/or other functional blocks and devices into lower performance modes to conserve electrical power and avoid generating excess heat when lower performance is acceptable. Given the reduced heat generation, operating in the lower performance modes means that the electronic devices can be kept cool at lower fan speeds, and thus can operate more quietly (i.e., as perceived by people in proximity to the electronic devices). As another example, the management units can place processors and/or other functional blocks and devices into higher performance modes when higher performance is desired (e.g., to execute more computationally intense workloads, etc.), although this can mean increased electrical power consumption and generation of heat. The increased generation of heat can necessitate higher fan speeds to keep the electronic devices cool—and thus mean louder operation for the electronic devices. In some of such electronic devices, for determining the operating conditions of the processors, memory, and/or other functional blocks and devices, the management units rely on information provided by numerous hardware sensors and software sensors (i.e., information from software routines such as in operating systems, application programs, firmware, etc.). For example, hardware sensors can provide information such as temperature information, fan speed information, and power source information. As another example, the software sensors can provide parameters such as software application information, plug/unplug event information, power mode information, functional block/device status information, etc. Given the large volume of information provided by hardware and software sensors and the number of possible operating conditions for the processors, memory, and/or other functional blocks and devices, it can be difficult to strike a balance between maximizing performance of electronic devices with keeping the electronic devices relatively cool and quiet.

BRIEF DESCRIPTION OF THE FIGURES

Throughout the figures and the description, like reference numerals refer to the same figure elements.

DETAILED DESCRIPTION

Figure 1:
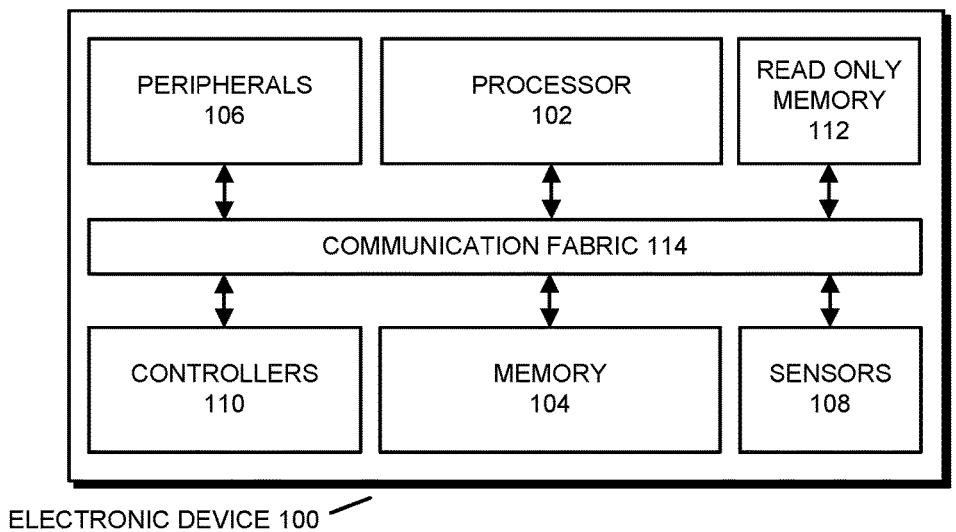
FIG. 1 presents a block diagram illustrating an electronic device in accordance with some implementations.

The following description is presented to enable any person skilled in the art to make and use the described implementations and is provided in the context of a particular application and its requirements. Various modifications to the described implementations will be readily apparent to those skilled in the art, and the general principles described herein may be applied to other implementations and applications. Thus, the described implementations are not limited to the implementations shown, but are to be accorded the widest scope consistent with the principles and features described herein.

In the following description, various terms are used for describing implementations. The following is a simplified and general description of some of the terms. Note that these terms may have significant additional aspects that are not recited herein for clarity and brevity and thus the description is not intended to limit these terms.

Functional block: functional block refers to a set of interrelated circuitry such as integrated circuit circuitry, discrete circuitry, etc. The circuitry is "interrelated" in that circuit elements in the circuitry share at least one property. For example, the circuitry may be included in, fabricated on, or otherwise coupled to a particular integrated circuit chip, substrate, circuit board, or portion thereof, may be involved in the performance of specified operations (e.g., computational operations, control operations, memory operations, etc.), may be controlled by a common control element and/or a common clock, may be included in the same electronic devices, etc. The circuitry in a functional block can have any number of circuit elements, from a single circuit element (e.g., a single integrated circuit logic gate or discrete circuit element) to millions or billions of circuit elements (e.g., an integrated circuit memory). In some implementations, functional blocks perform operations "in hardware," using circuitry that performs the operations without executing program code.

Data: data is a generic term that indicates information that can be stored in memories (e.g., a main memory, a cache memory, etc.) and/or used in computational, control, and/or other operations. Data includes information such as actual data (e.g., results of computational or control operations, outputs of processing circuitry, inputs for computational or control operations, variable values, sensor values, etc.), files, program code instructions, control values, variables, and/or other information.

In the described implementations, electronic devices include elements (i.e., functional blocks, devices, etc.) such as processors, memories, peripheral devices, network interfaces, etc. For example, the electronic devices may include tablet computers, laptop computers, desktop computers, etc. In operation, the elements in electronic devices generate heat, e.g., via Joule/resistive heating, etc., which can cause problems for the elements due to overheating, repeated heating/cooling cycles, and other effects. The electronic devices therefore include fans arranged to circulate atmospheric air into/through the electronic devices (i.e., vent hot air out of the electronic devices). The electronic devices also include one or more controllers that are arranged to dynamically set operating states of elements. For example, the controllers can set operating parameters such as the voltage at which electrical power is supplied to the elements, the frequencies of controlling clocks for the elements, the brightness of displays, etc. The electronic devices further include fan controllers that set speeds for fans in the electronic devices.

In the described implementations, processors in electronic devices execute a platform management driver. The platform management driver is lower-level software (e.g., driver software situated between an operating system and electronic device hardware in a software hierarchy) that performs operations for controlling operating states of elements of a respective electronic device (and possibly other operations, such as controlling operations of software entities executing on the electronic device). In some implementations, the platform management driver interacts with the above-described operating controllers and/or fan controllers for controlling the operating states of the elements (e.g., functional blocks, devices, fans, etc.) of the respective electronic device. For this operation, the platform management driver receives a number of inputs from hardware and software sensors in the respective electronic device (e.g., temperature sensors, software/workload information, subsystem usage sensors, etc.) and controls the operating states of the elements of the respective electronic device based on the inputs (i.e., based on whether the inputs meet specified conditions, such as via comparisons including IF, NOT, AND, EQUALS, GREATER THAN, etc.). For this operation, the platform management driver compares values for inputs (e.g., temperatures from a temperature sensor) to corresponding threshold(s) and determines output actions to be taken for controlling operating states of the elements in the respective electronic device. For example, when a temperature reported by a temperature sensor (an input) exceeds a temperature threshold (a condition), the platform management driver can communicate a request to a fan controller to cause one or more fans to be increased in speed, communicate requests to operating controllers to cause elements to be operated in lower power operating modes, etc. (output actions).

In the described implementations, a platform management driver can be statically and/or dynamically configured for performing operations for controlling operating states of elements of a respective electronic device. In other words, the platform management driver can be configured and reconfigured to perform respective output actions based on inputs meeting specified conditions. The platform management driver is configured using platform management profiles, which are files (or other data structures) that include information defining one or more platform management policies. Each of the platform management policies includes input information that identifies one or more inputs for that platform management policy; condition information that identifies one or more conditions for or associated with the one or more inputs; and output action information identifying one or more output actions to be performed by a given platform management driver for controlling operating states of elements when the one or more conditions are met. The platform management drivers can be "statically" configured in that the electronic devices upon which the platform management drivers execute can have platform management profiles installed at manufacture time and/or at another time prior to a user using the electronic device. The platform management drivers can be "dynamically" configured in that the electronic devices upon which the platform management drivers execute have platform management profiles installed and/or updated at runtime, e.g., at startup of the electronic devices, during operation of the electronic devices, etc.

In some implementations, an installing electronic device provides platform management profiles to other, or "target," electronic devices. In these implementations, the installing electronic device first acquires a platform management profile that includes information defining one or more platform management policies. The installing electronic device then provides the platform management profile to platform management drivers executing on one or more target electronic devices. The platform management drivers next extract the one or more platform management policies from the platform management profile and use the one or more platform management policies for controlling operating states of elements of a respective target electronic device. In other words, the platform management drivers use the platform management policies to determine output actions and/or provided output actions to be performed for controlling operating states of elements based on conditions specified for inputs and/or provided inputs in the platform management policies. Note that, in some of these implementations, the installing electronic device and the target electronic device are the same electronic device—and thus the above-described operations are performed within a particular electronic device.

In some implementations, for providing platform management profiles to electronic devices as described, the installing electronic device provides policy header files to the electronic devices. Generally, policy header files are files (or other data structures) that include information from which platform management drivers can extract platform management profiles— and thus the platform management policies included therein. In some of these implementations, the installing electronic device provides the policy header file to the electronic devices "statically"—and thus configure platform management drivers running thereon statically as described above. For example, the installing electronic device can provide the policy header file to the electronic devices at manufacture time as one or more parts of the electronic devices are fabricated, assembled, and/or otherwise manufactured, in a testing lab as one or more parts of the electronic devices are tested, evaluated, etc., and/or at another time. In some implementations, in contrast or in addition to statically providing policy header files to electronic devices, the installing electronic device provides the policy header file to the electronic devices "dynamically"— and thus configure platform management drivers running thereon dynamically as described above. As used here, "dynamically" indicates that the policy header file on a given device can be updated one or more times during the lifetime of an electronic device. For example, a vendor, manufacturer, user, and/or other entity may determine that particular platform management policies result in poor operation of electronic devices or figure out new platform management policies (e.g., based on newly available sensor information, electronic device usage data, etc.)— and therefore replace the particular platform management policies with updated platform management policies or add new platform management policies. Several implementations for statically and dynamically providing policy header files to electronic devices (e.g., via BIOS files and/or a policy management application) are described in related U.S. application Ser. No. 17/559,984, from the same inventors, which was filed on 22 Dec. 2021, and which is incorporated herein by reference in its entirety.

In the described implementations, platform management drivers include mechanisms for handling provided inputs and provided output actions. Generally, provided inputs are inputs used in platform management policies that are unknown to the platform management driver—and may be from hardware and/or software sensors that are themselves unknown to the platform management driver. Provided output actions are output actions used in platform management policies that are unknown to the platform management driver—and for hardware and/or software entities or functions thereof that are unknown to the platform management driver. The provided inputs and provided output actions are therefore not included in a set of inputs and output actions that are defined in the platform management driver. Because provided inputs and provided output actions are unknown to the platform management driver, the platform management driver does not have knowledge of the meaning or properties of provided inputs or provided output actions. The platform management driver is, however, able to handle provided inputs by accepting provided inputs having a predetermined format for values. In other words, when values for provided inputs are communicated to the platform management driver in an expected/generic format (or one of a set of acceptable formats), the platform management driver can use the provided inputs for platform management policies as described herein. The platform management driver is also able to perform provided output actions despite the platform management driver not knowing the particular nature of the output actions and/or the hardware and/or software entities or functions thereof effected by the output actions. In other words, the platform management driver, given a definition of a provided output action (i.e., information that identifies operations to be performed by the platform management driver when performing the provided output action), can perform output actions that the platform management driver was not previously programmed to perform.

In some implementations, for using provided inputs, the platform management driver receives, in a platform management profile, a platform management policy that includes a provided input from a specified hardware or software sensor, as well as one or more associated conditions and one or more output actions and/or provided output actions. The platform management driver records the provided input along with the one or more associated conditions and the one or more output actions and/or provided output actions from the platform management policy in a similar way as other inputs and conditions—although the provided input otherwise remains unknown to the platform management driver as described above. The platform management driver then uses the platform management policy for controlling operating states of elements in the electronic device. This operation involves the platform management driver receiving a value for the provided input in the predetermined format. Based on whether the value for the provided input meets the one or more conditions identified in the platform management policy (or not), the platform management driver performs the one or more output actions and/or provided output actions identified in the platform management policy to control operating states of elements of the electronic device. In addition, for using provided output actions, the platform management driver receives, in a platform management profile, a platform management policy that includes a provided output. The platform management driver records the platform management policy and then uses the platform management policy for controlling operating states of elements in the electronic device. This operation involves the platform management driver performing the provided output actions to control operating states of elements of the electronic device when inputs and/or provided inputs meet one or more conditions as identified in the platform management policy. Note that controlling operating states of "elements," as described herein can include controlling operating states of individual elements (e.g., individual functional blocks, devices, fans, etc.) or groups of elements.

In some implementations, the platform management driver provides an input interface for receiving values for provided inputs during operation. In other words, the platform management driver provides an input interface via which functional blocks, devices, and/or software entities can provide, to the platform management driver, values for the provided inputs. For example, in some implementations, the platform management driver provides a BIOS notification interface. In these implementations, the values for the provided inputs are communicated from BIOS program code executing on the electronic device to the platform management driver via the BIOS notification interface. In other words, in these implementations, the BIOS program code includes program code for acquiring or receiving values for provided inputs from the respective hardware and/or software sensors in the electronic device and providing the values for the provided inputs to the platform management driver via the BIOS notification interface. In addition, in some implementations, the platform management driver provides an output interface via which the platform management driver can perform provided output actions—i.e., can communicate requests, commands, etc. for provided output actions to other software entities.

In some implementations, electronic devices (e.g., a policy management application executing on the electronic devices, etc.) provide a graphical user interface that can be used for generating platform management profiles and/or the platform management policies therein. The user interface includes graphical elements selectable by users for defining platform management policies and/or platform management profiles. In these implementations, the electronic device provides a user interface including input elements representing inputs available for use in platform management policies, output action elements representing output actions available for use in platform management policies, and condition elements representing conditions under which values for the inputs are to cause respective output actions. The electronic device then receives selection actions for the user interface (i.e., mouse points/clicks and/or other selection operations) that select combinations of input elements, output action elements, and condition elements defining the one or more platform management policies. Based at least in part on the selection actions, the electronic device generates platform management policies and/or platform management profiles in which platform management policies are included. In some implementations, the user interface additionally includes graphical elements for inputting information identifying provided inputs and provided output actions to be used in platform management policies. In these implementations, based at least in part on the input actions inputting information that identifies provided inputs and/or provided output actions, the electronic device generates platform management policies that include the provided inputs and/or provided output actions and/or platform management profiles in which platform management policies are included. In some implementations, however, the graphical user interface is not used for acquiring platform management profiles as described above. In these implementations, the electronic device receives platform management policies and/or platform management profiles through other means, such as by receiving manually created platform management policies and/or platform management profiles (i.e., using a text editor, a command line interface, etc.), by reading the platform management profiles from memory, etc.

By providing the platform management profile to platform management drivers executing on one or more electronic devices as described above, the described implementations can enable entities (e.g., manufacturers, vendors, users, etc.) to distribute platform management policies that enable platform management drivers to more precisely control operating states of elements of electronic devices. This can enable the electronic devices to operate more intelligently with respect to available inputs (i.e., hardware and software sensor values) and thus be quieter (i.e., have less fan noise) and use power more efficiently. In addition, by providing the user interface and the mechanisms for providing/distributing policy header files to electronic devices, the described implementations provide a centralized platform management framework that enables entities to more easily handle power management and electronic device operation. By enabling the platform management driver to use provided inputs and provided output actions, the described implementations enable platform management drivers to control operating states of elements of electronic devices based on inputs (and possibly respective hardware and/or software sensors) and output actions that are not otherwise known to the platform management driver. This can significantly increase the situations in which platform management policies are able to be used, e.g., for proprietary and newly introduced hardware and software sensors, for newly available or otherwise unknown output actions for hardware and/or software entities or functions thereof, etc. The described implementations therefore improve both: (1) the process of generating controls for electrical power consumption and noise control for electronic devices and (2) the function of the electronic devices themselves. This increases user satisfaction with both the process and the electronic devices.

FIG. 1 presents a block diagram illustrating an electronic device 100 in accordance with some implementations. As can be seen in FIG. 1, electronic device 100 includes processor 102, memory 104, peripherals 106, sensors 108, controllers 110, read only memory 112, and communication fabric 114. Generally, processor 102, memory 104, peripherals 106, sensors 108, controllers 110, read only memory 112, and communication fabric 114 are implemented in hardware, i.e., using corresponding integrated circuitry, discrete circuitry, and/or devices. For example, in some implementations, processor 102, memory 104, peripherals 106, sensors 108, controllers 110, read only memory 112, and communication fabric 114 are implemented in integrated circuitry on one or more semiconductor chips, are implemented in a combination of integrated circuitry on one or more semiconductor chips in combination with discrete circuitry and/or devices, or are implemented in discrete circuitry and/or devices. In some implementations, processor 102, memory 104, peripherals 106, sensors 108, controllers 110, read only memory 112, and/or communication fabric 114 perform operations for or associated with using platform management profiles and/or platform management policies for controlling operating states of elements, (e.g., functional blocks, devices, etc.) in electronic device 100 as described herein.

Processor 102 is a functional block that performs computational, memory access, control, and/or other operations. For example, processor 102 can be a central processing unit (CPU), a graphics processing unit (GPU), an accelerated processing unit, a system on a chip (SOC), a field programmable gate array (FPGA), etc. For example, in some implementations, processor 102 is an SOC including one or more CPU cores—and peripherals 106 includes discrete graphics with one or more GPU cores (e.g., a graphics card with one or more GPUs). As another example, in some implementations, processor 102 is an SOC that includes one or more CPU cores, as well as one or more GPU cores.

Memory 104 is a functional block that stores data for processor 102 (and possibly other elements in electronic device 100). For example, in some implementations, memory 104 is a higher capacity integrated circuit memory (e.g., a "main" memory, etc.) into which copies of data (e.g., 4 kB pages of data) retrieved from a storage device (not shown) are stored for accesses by processor 102. Memory 104 includes memory circuitry such as fourth generation double data rate synchronous dynamic random-access memory (DDR4 SDRAM) and/or other types of memory circuits, as well as control circuits for handling accesses of the data stored in the memory circuits.

Peripherals 106 includes elements (e.g., functional blocks, devices, etc.) that perform various operations and interact with other elements in electronic device 100. For example, in some implementations, peripherals 106 include one or more discrete GPUs, embedded controllers, power monitors, application specific integrated circuits (ASICs), digital signal processors (DSPs), network processors, disk drives or non-volatile semiconductor memories, expansion cards (e.g., video cards, sound cards, network interface controllers, etc.), mice/keyboards, displays, microphones, media players, and/or other peripherals.

Sensors 108 includes elements (e.g., functional blocks, devices, etc.) that perform operations for sensing internal and/or external operating environment values for electronic device 100. For example, in some implementations, sensors 108 include some or all of temperature sensors, proximity sensors (e.g., user detection sensors, etc.), user movement and/or gaze sensors, sound sensors, light sensors, location/movement sensors, lid closure sensors, external device detection sensors, battery level sensors, subsystem power mode sensors, position sensors, etc. Sensors 108 can provide data and information representing sensed operating environment values to other elements (e.g., processor 102), where the operating environment values can be used for operations such as determining whether condition involving a sensed environment value meets one or more conditions (e.g., a sensed temperature meets a temperature threshold, whether a user is detected as being present, etc.) for a platform management policy. In some implementations, sensors 108, which, again, include elements, are considered "hardware" sensors, in contrast to "software" sensors, which are implemented in software (e.g., operating system routines, application programs, firmware, etc.).

In some implementations, sensors 108 includes one or more sensors that are unknown to a platform management driver executed by processor 102 (e.g., platform management driver 418). In some implementations, although a given sensor itself may be known to the platform management driver, the given sensor can provide sensor data that is unknown to the platform management driver (e.g., from an unknown function of a given sensor, a new capability of a given sensor, etc.). The outputs from the unknown sensors and/or the unknown outputs from known sensors are examples of provided inputs to the platform management driver, which can be used as described herein.

Controller 110 is a functional block that performs operations for controlling operating states of elements (e.g., functional blocks, devices, etc.) in electronic device 100. For example, in some implementations, controller 110 is or includes a fan controller that controls the speed of one or more cooling fans in electronic device 100. As another example, in some implementations, controller 110 is or includes a power controller, embedded controller, and/or management unit that sets operating states of other elements (e.g., processor 102, peripherals 106, etc.) in electronic device 100.

Read-only memory (ROM) 112 is a functional block having non-volatile memory circuitry (e.g., flash memory, etc.) that is used for storing data that is to persist despite electronic device 100 having been powered down/turned off. In some implementations, read-only memory 112 is used for storing basic input output system (BIOS) and/or unified extensible firmware interface (UEFI) files with low-level program code that is executed during startup of electronic device. In some implementations, the BIOS (or UEFI) files include one or more policy header files with platform management profiles having a number of platform management policies as described herein. In some implementations, the BIOS files include BIOS program code that performs the operations of a BIOS as well as the operations described herein (e.g., initializing elements in electronic device 100, reporting hardware and/or software sensor values to a platform management driver, etc.).

Although electronic device 100 is shown in FIG. 1 with a particular number and arrangement of elements, in some implementations, electronic device 100 includes different numbers and/or arrangements of elements. For example, in some implementations, electronic device 100 includes a different number of processors 102. As another example, although shown with only one peripheral 106, in some implementations, electronic device 100 includes multiple separate peripherals, such as a network interface card, a GPU, expansion cards, etc. As another example, although shown with only one controller 110, in some implementations, electronic device 100 includes multiple separate controllers, such as a fan controller, an electrical power controller, embedded controller, etc. Electronic device 100 is also simplified for illustrative purposes. In some implementations, however, electronic device 100 includes additional and/or different elements. For example, electronic device 100 can include separate human interface subsystems (e.g., displays, speakers, keyboards, etc.), electrical power and/or battery subsystems, input-output (I/O) subsystems, etc. Generally, in the described implementations, electronic device 100 includes sufficient numbers and/or arrangements of elements to perform the operations herein described.

Electronic device 100 can be, or can be included in, any device that performs the operations described herein. For example, electronic device 100 can be, or can be included in, a desktop computer, a laptop computer, a wearable electronic device, a tablet computer, virtual or augmented reality equipment, a smart phone, an artificial intelligence (AI) or machine learning device, a server, a network appliance, a toy, a piece of audio-visual equipment, a home appliance, a vehicle, etc., and/or combinations thereof. In some implementations, electronic device 100 is included on one or more semiconductor chips. For example, in some implementations, electronic device 100 is entirely included in a single "system on a chip" (SOC) semiconductor chip, is included on one or more ASICs, etc.

Figure 2:
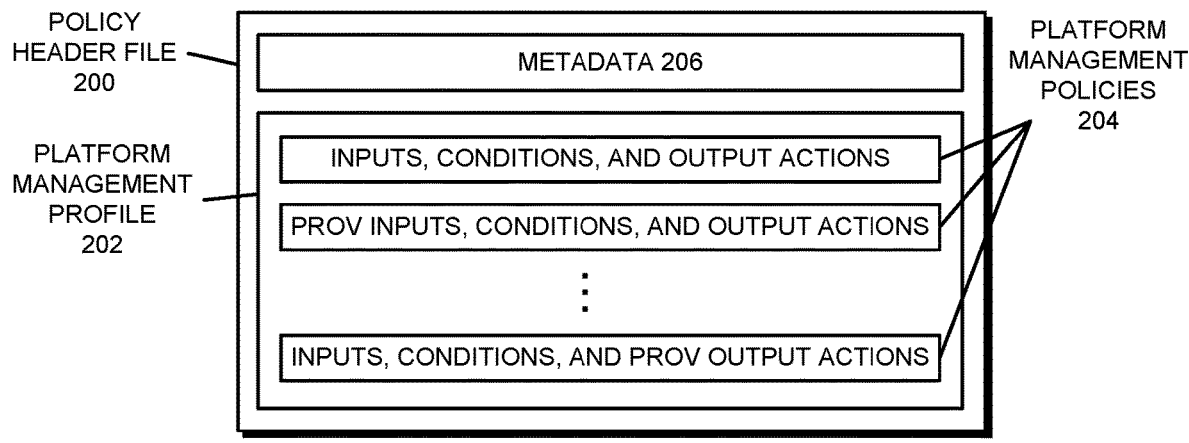
FIG. 2 presents a block diagram illustrating a policy header file in accordance with some implementations.

In the described implementations, a platform management driver (e.g., platform management driver 418) is configured to use platform management profiles for various operations. In some implementations, platform management profiles are communicated to platform the management driver using policy header files. FIG. 2 presents a block diagram illustrating a policy header file 200 in accordance with some implementations. Generally, policy header file 200 is a file (e.g., a binary, a configuration file, etc.), a record, a table, a listing, and/or another data structure that can be stored in memories, compiled into other files (e.g., BIOS files, etc.), read/interpreted by hardware and/or software entities (e.g., the platform management driver, etc.), etc. as described herein.

As can be seen in FIG. 2, policy header file 200 includes platform management profile 202. Platform management profile 202 is a grouping or other arrangement of platform management policies 204. In some implementations, policy header file 200 can include multiple different platform management policies 204, each of platform management policies 204 to be used in particular situations (e.g., for specified runtime conditions, etc.). Platform management policies 204 are each listings, records, and/or other identifiers for determining when a specified output action is to be taken based on one or more inputs meeting an indicated condition. Platform management policies 204 therefore include input information (INPUTS) that identifies one or more inputs for that platform management policy; condition information (CONDITIONS) that identifies one or more conditions for or associated with the one or more inputs; and output action information (OUTPUT ACTIONS) identifying one or more output actions to be performed by a given platform management driver for controlling operating states of elements in an electronic device (e.g., functional blocks, devices, fans, etc.) when the one or more conditions are met. For example, a platform management policy 204 may specify that a display screen of an electronic device is to be brightened (output action) when running (a condition) a particular application (an input) and an ambient light sensor (an input) detects bright light (a condition) in the environment of the electronic device. As another example, a platform management policy 204 may specify that, when a temperature reported by a temperature sensor (an input) exceeds a temperature threshold (a condition), one or more fans are to be increased in speed, one or more elements are to be operated in lower power operating modes, etc. (output actions).

As can also be seen in FIG. 2, platform management policies can also include provided input information (PROV INPUTS) that identify one or more provided inputs for that platform management policy. Provided inputs are inputs from hardware and/or software sensors that are unknown to a platform management driver—and may be from hardware and/or software sensors that are themselves unknown to the platform management driver. For example, a provided input may be from a proprietary or newly developed sensor, may be a new sensor function for an existing sensor, etc. Provided inputs are described in more detail below. Note, however, that, although provided inputs are shown alone in a platform management policy for clarity and brevity, platform management policies can use combinations of provided inputs and other inputs, as well as output actions and/or provided output actions, in individual platform management policies.

As can also be seen in FIG. 2, platform management policies can also include provided output actions (PROV OUTPUT ACTIONS) that identify one or more provided output actions for that platform management policy. Provided output actions are output actions to be performed by the platform management driver that are unknown to a platform management driver—and may involve hardware and/or software entities and/or functions thereof that are unknown to the platform management driver. For example, a provided output action may involve the platform management driver interacting with a new hardware and/or software entity and/or a previously unknown function of a previously known hardware and/or software entity. Provided output actions are described in more detail below. Note, however, that, although provided output actions are shown alone in a platform management policy for clarity and brevity, platform management policies can use combinations of provided output actions and other output actions, as well as inputs and provided inputs, in individual platform management policies.

Metadata 206 includes information identifying policy header file 200, such as a source of policy header file 200, version information for policy header file 200, security information for policy header file 200, etc.

Although policy header file 200 is presented with a number and arrangement of elements (e.g., platform management policies 204, etc.) in some implementations, policy header file includes different elements and/or the elements are arranged differently. For example, in some implementations, although separate platform management policies are shown with provided inputs and provided output actions, platform management policies can include any combination of inputs, provided inputs, output actions, and provided output actions. Generally, in the described implementations, policy header file 200 includes sufficient elements to perform the operations herein described.

In the described implementations, a platform management driver (e.g., platform management driver 418) can accept and use provided inputs. Provided inputs are inputs to a platform management driver provided by hardware and/or software sensors in an electronic device upon which the platform management driver is executing that are unknown to the platform management driver. Provided inputs are "provided" in contrast to other inputs that are known to the platform management driver (provided inputs might also be called "unknown" inputs, "undefined" inputs, etc.). Hence, while at least some of the inputs otherwise described herein can be included in a set of inputs that are defined in or otherwise known to the platform management driver, the provided inputs are not so defined or otherwise known. In some implementations, provided inputs are/were deliberately or unavoidably not included in a set of inputs that is defined for the platform management driver by a developer of the platform management driver (or another entity). For example, provided inputs can include inputs from hardware and/or software sensors that were unknown to the developers of the platform management driver—and the hardware and/or software sensors themselves may not have been available/existed (i.e., may be newly developed sensors). As another example, provided inputs can include inputs from proprietary/vendor-specific hardware and/or software sensors, such as sensors included by other developers in functional blocks, devices, and software entities (e.g., software applications, drivers, operating systems, etc.). As another example, provided inputs can include inputs from hardware and/or software sensors that could have been known to the developers, but were left out of the platform management driver due to limited time, budget, and/or to avoid having to guarantee that the platform management driver is properly configured for a large (and ever-growing) number of hardware and/or software sensors.

Because provided inputs are unknown to the platform management driver, the platform management driver does not have knowledge of the characteristics of the provided inputs—and may know nothing about the hardware or software sensors that produced/generated the provided inputs. The platform management driver therefore does not know (i.e., is not programmed with information about) the meaning and/or properties of provided inputs. The platform management driver is, however, able to handle provided inputs by accepting provided inputs having a predetermined format. That is, the platform management driver can handle a provided input from any hardware and/or software sensor, as long as values for the provided input are provided to the platform management driver in the specified/generic format and the provided input is fully identified to the platform management driver. For example, in some implementations, the platform management driver can accept provided inputs as long as the provided inputs are in a doubleword format. In these implementations, therefore, if provided inputs are not already in the specified format when produced by a hardware or software sensor, the values for the provided inputs must be adapted to the specified format. For example, if a hardware sensor outputs an eight bit output signal, the eight bit output signal should be incorporated into the specified format (e.g., with padding bits, truncated/compressed, etc.). The provided inputs can be fully identified to the platform management driver by providing the platform management driver with any name, identifier, port number, source hardware or software sensor, etc. that enables the platform management driver to find/acquire or accept the provided input (e.g., receive the provided input from a source hardware and/or software sensor—or an intermediary hardware or software element).

With regard to the use of provided inputs, the platform management driver uses the provided inputs similarly to other inputs (i.e., non-provided inputs such as those with which the platform management driver is programmed), although, as described above, the values for provided inputs are to be communicated to the platform management driver in the specified format. The platform management driver therefore receives provided inputs and possibly inputs in platform management policies that include corresponding conditions and output actions/provided output actions, and then uses the provided inputs/inputs and conditions from the platform management policies for determining output actions/provided output actions to be performed as described herein.

In the described implementations, a platform management driver (e.g., platform management driver 418) can use provided output actions. Provided output actions are output actions to be performed by a platform management driver that are unknown to the platform management driver prior to being included in a platform management policy. In other words, using provided output actions, a platform management policy can be caused to perform output actions that are not identified in program code for the platform management driver itself. Provided output actions are considered "provided" in contrast to other output actions that are known to the platform management driver (provided output actions might also be called "unknown" output actions, "undefined" output actions, etc.). Hence, while at least some of the output actions otherwise described herein can be included in a set of output actions that are defined in or otherwise known to the platform management driver, the provided output actions are not so defined or otherwise known. In some implementations, provided output actions are/were deliberately or unavoidably not included in a set of output actions that is defined for the platform management driver by a developer of the platform management driver (or another entity). For example, provided output actions can include output actions involving hardware and/or software entities (e.g., controllers, application programs, functional blocks, devices, operating system functions, etc.) that were unknown to the developers of the platform management driver—and that may not have been available/existed (i.e., may be newly developed hardware and/or software entities). As another example, provided output actions can involve functions, operations, actions, capabilities, etc. of known hardware and/or software entities that were unknown to the developers of the platform management driver, despite the platform management driver having at least general knowledge of the hardware and/or software entities. As another example, provided output actions can include output actions that could have been known to the developers, but were left out of the platform management driver due to limited time, budget, and/or to avoid having to guarantee that the platform management driver is properly configured for a large (and ever-growing) number of output actions.

Because provided output actions are unknown to the platform management driver, the platform management driver does not have knowledge of the characteristics of the provided output actions—and may know nothing about the hardware or software entities involved with the provided output actions. The platform management driver therefore does not know (i.e., is not programmed with information about) the meaning and/or properties of provided output actions. The platform management driver is, however, able to handle provided output actions by accepting provided output actions that are sufficiently identified to enable the platform management driver to perform the provided output actions. That is, the platform management driver can handle a provided output action for any hardware and/or software entity, as long the particulars of the provided output action are provided to the platform management driver. For example, in some implementations, the platform management driver can accept provided output actions as long as the provided output action identifies the operations to be performed by the platform management driver, such as target hardware and/or software entities and values, commands, requests, signals, etc. to be communicated to the target hardware and/or software entities. The provided output actions can be fully identified to the platform management driver by providing the platform management driver with a name, identifier, port number, destination, etc. for the involved hardware and/or software entities and/or operations to be performed for the provided output actions. For example, if a provided output action involves disabling a particular function or operation of a hardware or software entity, the provided output action should identify the hardware or software entity and include information (e.g., command/request format, signal name(s), information to be included in commands/requests, etc.) to be used by the platform management driver for requesting or commanding the disabling of the particular function or operation.

With regard to the use of provided output actions, the platform management driver uses the provided output actions similarly to other output actions (i.e., non-provided output actions such as those with which the platform management driver is programmed), although, as described above, the provided output actions are to be sufficiently identified to the platform management driver to enable the platform management driver to perform the provided output actions. The platform management driver therefore receives provided output actions in platform management policies that include corresponding conditions and inputs/provided inputs and possibly output actions, and then uses the inputs/provided inputs and conditions from the platform management policies for determining the provided output actions/output actions to be performed as described herein.

Figure 3:
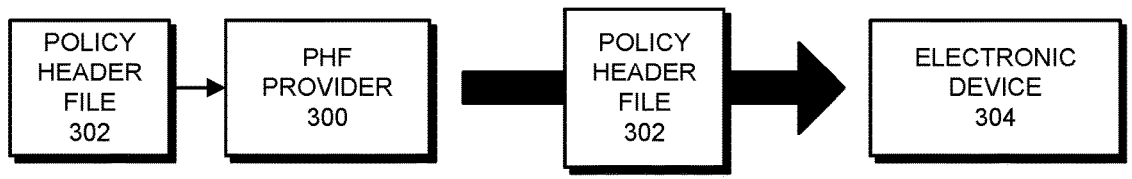
FIG. 3 presents a block diagram illustrating providing a platform management profile to an electronic device in accordance with some implementations.

In the described implementations, an electronic device, or an "installing" electronic device, provides platform management profiles to electronic devices, or "target" electronic devices. FIG. 3 presents a block diagram illustrating providing a platform management profile to an electronic device in accordance with some implementations. As can be seen in FIG. 3, policy header file provider 300, which is an installing electronic device, acquires policy header file 302, which includes at least one platform management profile (as described for FIG. 2). Policy header file provider 300 then provides policy header file 302 electronic device 304, which is a target electronic device (as shown via the black arrow). As described in more detail elsewhere herein, a platform management driver executed by electronic device 304 then uses the platform management profile included in policy header file 302 for controlling operating states of elements (e.g., functional blocks, devices, etc.).

In the described implementations, various operations can be performed for providing the policy header file 302 to electronic device 304. For example, in some implementations, policy header file 302 is communicated to electronic device via a wired or wireless network. As another example, in some implementations, policy header file 302 is included on an integrated circuit chip (e.g., a ROM integrated circuit chip) that is installed in electronic device 304. Generally, in the described implementations, policy header file 302 is transferred from policy header file provider 300 (again, an installing electronic device) to electronic device 304. In addition, although described as separate electronic devices, in some implementations, policy header file provider 300 and electronic device 304 are the same electronic device—and thus the operations described herein are performed by entities within the same electronic device.

Figure 4:
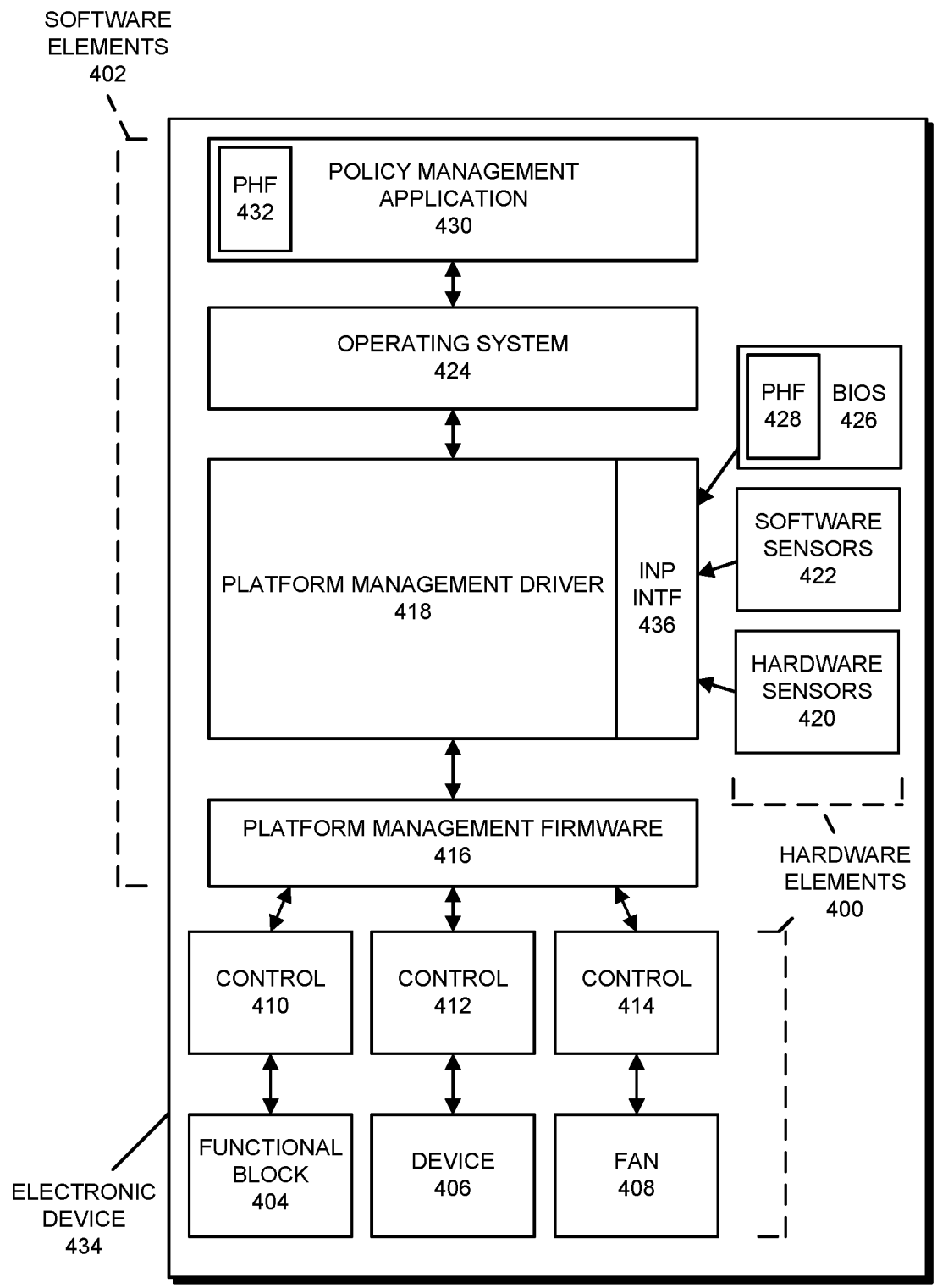
FIG. 4 presents a block diagram illustrating hardware elements and software elements in an electronic device in accordance with some implementations.

In the described implementations, hardware and software elements in an electronic device perform operations for using platform management policies from platform management profiles for controlling operating states of elements (e.g., functional blocks, devices, etc.) of the electronic device. FIG. 4 presents a block diagram illustrating hardware elements 400 and software elements 402 in an electronic device in accordance with some implementations. Generally, "hardware" elements 400 are elements (e.g., functional blocks, devices, etc.) that include circuitry and/or devices within the electronic device, while "software" elements 402 are software entities executed by the electronic device. In other words, software elements 402 are or include program code that, when executed by one or more processors (or other elements) in the electronic device, cause the one or more processors to perform the operations described herein (and possibly other operations).

As can be seen in FIG. 4, the hardware elements 400 include functional block 404, device 406, and fan 408. Functional block 404 is a functional block such as a CPU, GPU, ASIC, network interface card, interconnect controller, memory controller, etc. Device 406 is a device such as a disk drive, display/display controller, expansion card, etc. Fan 408 is a cooling fan that circulates air through a chassis in which functional block 404 and device 406 are included (e.g., a desktop or server computer case, a laptop body, etc.) in order to help regulate the temperature of functional block 404 and device 406. That is, to help prevent functional block 404 and device 406 or the chassis from overheating by circulating air past functional block 404 and device 406.

The hardware elements 400 also include controller (CONTROL) 410, controller 412, and controller 414. Controller 410 is a controller (e.g., a management unit, embedded controller, power controller, etc.) that controls the operating state of functional block 404. Controller 412 is a controller that controls the operating state of device 406. Controller 414 is a fan controller that controls the operating speed of fan 408. In some implementations, controllers 410-414 communicate commands, information, and/or other requests to the respective hardware elements (i.e., functional block 404, device 406, etc.) in order to set and reset the operating states of the respective hardware elements (possibly in addition to performing other operations). For example, controller 410 can set voltages, clock frequencies, queue depths, communication rates, memory access rates, and/or other operating parameters of functional block 404 to align with desired operating states. For instance, controller 410 may cause functional block 404 to operate in a lower power operating state such as a sleep or low performance operating state by reducing power supply voltages and/or clock frequencies provided to functional block 404—or by commanding functional block 404 to enter the lower power operating state (i.e., reduce its own power supply voltages and/or clock frequencies).

Software elements 402 include platform management firmware 416. Platform management firmware 416 is a software entity that performs operations of firmware program code executed by a processor in the electronic device. Platform management firmware 416 receives (via a software interface) data, control signals, etc. destined for controls 410-414 from platform management driver 418 and forwards corresponding communications to controls 410-414. For example, in some implementations, platform management firmware 416 receives, from platform management driver 418, a command destined for a given controller from among controllers 410-414 (e.g., a command to enter a particular power mode) and communicates a corresponding command to the given controller. Platform management firmware 416 also receives (via a software interface) data, control signals, etc. destined for platform management driver 418 from controls 410-414 and forwards corresponding communications to platform management driver 418. For example, in some implementations, platform management firmware 416 receives sensor values from some or all of functional block 404, device 406, and/or fan 408 via the respective controller 410-414 and forwards the sensor values to platform management driver 418.

Software elements 402 also include platform management driver 418. Platform management driver 418 is a software entity that performs operations of driver program code executed by a processor in the electronic device. Platform management driver 418 and platform management firmware 416 together are software entities that perform operations for controlling the operating state of functional block 404, devices 406, and/or fans 408—i.e., are part of a platform management framework for implementing platform management policies as described herein. Platform management driver 418 receives data, control signals, sensor information, etc. from other hardware elements and software elements and interacts with controllers 410-414 for controlling the operating states of the functional block 404, device 406, and/or fan 408. For this operation, platform management driver 418 receives inputs from hardware elements and/or software elements (e.g., hardware sensors 420, software sensors 422, functional block 404 (via controller 410 and platform management firmware 416), operating system 424, BIOS 426, etc.) and determines operating states for some or all of functional block 404, device 406, and/or fan 408. Platform management driver 418 then communicates commands, settings, thresholds, and/or other information to controllers 410-414 via platform management firmware 416 that are used by controllers 410-414 for controlling functional block 404, device 406, and/or fan 408 (collectively, "elements"). In some implementations, platform management driver 418 also performs other operations associated with platform management. The operations performed by platform management driver 418 are described in more detail below.

Hardware elements 400 also include hardware sensors 420. Hardware sensors 420 are functional blocks and devices that sense internal and/or external operating environment values (e.g., sensors 108). For example, in some implementations, hardware sensors 420 include some or all of temperature sensors, proximity sensors (e.g., user detection sensors, etc.), user movement and/or gaze sensors, sound sensors, light sensors, location/movement sensors, lid closure sensors, external device detection sensors, battery level sensors, subsystem power mode sensors, physical location sensors, etc. Hardware sensors 420 provide data and information representing sensed operating environment values to platform management driver 418, where the operating environment values can be used for various operations including evaluating platform management policies as described herein.

Software elements 402 also include software sensors 422. Software sensors 422 are software entities that perform operations of software sensor program code for sensing internal and/or external software operating conditions for software executed by the processor in the electronic device. For example, in some implementations, software sensors are implemented as part of application software, firmware, driver, and/or other software executed by the processor. Software sensors 422 can monitor and/or determine and report values such as current or future workload profiles, currently executing applications, status of functional blocks or devices, network traffic levels, full-screen or windowed application reports for software applications executing on electronic device 434, foreground or background software applications executing on electronic device 434, frames per second for software applications executing on electronic device 434, etc. Software sensors 420 provide data and information representing sensed software operating condition values to platform management driver 418, where the software operating condition values can be used for various operations including evaluating platform management policies as described herein.

Software elements 402 also include operating system 424. Operating system 424 is a software entity that performs operations of an operating system executed by the processor in the electronic device. Operating system 424 interfaces between electronic application software executing on electronic device 434 and lower level software elements (e.g., platform management driver 418) and hardware elements (e.g., functional block 404, etc.). For example, operating system 424 may be Windows® from Microsoft of Redmond, WA, macOS® from Apple, Inc. of Cupertino, CA, etc. In some implementations, operating system 424 includes additional software sensors and therefore provides data and information for software sensors to platform management driver 418. In other words, one or more sensing routines included within operating system 424 provide sensor values to platform management driver 418, the sensor values useable by platform management driver 418 for various operations as described herein.

In some implementations, at least some inputs from hardware sensors 420 and/or software sensors 422 (which can include software sensors in operating system 424) are unknown to platform management driver 418—and the hardware sensors 420 and/or software sensors 422 may themselves be unknown to platform management driver 418. In other words, at least some sensor values output by hardware sensors 420 and/or software sensors 422 are not included in definitions of inputs for/in platform management driver 418. Platform management driver 418 therefore does not know the characteristics of these inputs (i.e., is not programmed with information about meanings for the values of these inputs). In these implementations, however, platform management driver 418 can accept and use data from unknown hardware sensors 420 and software sensors 422 as long as the data is in a specified format and the provided inputs are fully identified to the platform management driver 418. The use of unknown inputs from hardware sensors 420 and/or software sensors 422 by platform management driver 418 is described in more detail below.

Software elements 402 also include BIOS 426. BIOS 426 is a software entity that performs operations of a BIOS (and/or a Unified Extensible Firmware Interface (UEFI)) executed by the processor in electronic device 434. Generally, BIOS 426 includes program code stored in a read only memory (ROM) (e.g., read only memory 112) that is executed by the processor at startup for initializing elements (functional blocks, devices, etc.) in electronic device 434, as well as for launching operating system 424. In some implementations, platform management driver 418 interacts with BIOS 426 for controlling the operating state of functional block 404, device 406, and/or fan 408. In these implementations, a policy header file 428 is compiled into (i.e., added to, appended to, combined with) one or more BIOS files for BIOS 426 (e.g., at manufacture time and/or subsequently). Platform management driver 418 reads policy header file 428 from the one or more BIOS files from BIOS 426 and extracts the platform management profile from policy header file 428. Operations for using BIOS 426 for providing policy header files 428 to platform management driver 418 are described in more detail below.

In some implementations, platform management driver 418 includes input interface (INP INTF) 436, which is an interface via which platform management driver 418 can receive data from sensors such as hardware sensors 420 and software sensors 422 (which may include software sensors in operating system 424). Particularly, platform management driver 418 can receive provided inputs from hardware sensors 420 and software sensors 422—although other sensor data may be received by platform management driver 418 via input interface 436. For example, in some implementations, input interface 436 is provided by platform management driver 418 so that BIOS 426 (i.e., BIOS program code executing on a processor in electronic device 434) can receive values for provided inputs from hardware sensors 420 and/or software sensors 422 and provide the values for the provided inputs to platform management driver 418 via input interface 436. In some implementations, input interface 436 receives provided inputs in a given format, such as a double word, etc.

Software elements 402 also include policy management application 430. Policy management application 430 is a software entity that performs operations of an application program executed by the processor in electronic device 434. In some implementations, policy management application 430 is a software application that interacts with platform management driver 418 for controlling the operating state of functional block 404, device 406, and/or fan 408—i.e., is part of a platform management framework for implementing platform management policies. In some implementations, policy management application 430 is an application (possibly a background application) that is installed on electronic device by a manufacturer, software vendor, end user, and/or other entity. In some implementations, policy management application is an application that is installed on electronic device 434 by a testing entity (e.g., a testing lab for a manufacturer, an end user, and/or another entity). In some implementations, policy management application 430 provides policy header files (PHF) 432 (e.g., policy header file 200) to platform management driver 418 (via operating system 424) as described herein.

In some implementations, at least some of functional block 404, device 406, and fan 408 are hardware entities that are—or perform functions or operations that are—unknown to platform management driver 418. In addition, operating system 424 and other software entities are—or perform functions or operations that are—unknown to platform management driver 418. In other words, in some implementations, platform management driver 418 does not know of these hardware and/or software entities—or of at least some of the functions, operations, etc. performed by the hardware and/or software entities. Despite this, the unknown hardware and/or software entities can be included in provided output actions for platform management policies as described herein. In other words, by using provided output actions in platform management policies, platform management driver 418 can be caused to interact with previously unknown hardware and/or software entities.

Although a number of hardware elements 400 and software elements 402 are presented in FIG. 4, in some implementations, different hardware elements and software elements are present. For example, in some implementations, multiple functional blocks, devices, and/or fans are present in hardware elements 400. As another example, in some implementations, controller 410 is not a single controller, but is or includes multiple controllers (e.g., a separate functional block controller, a fan controller, etc.). Generally, the described implementations include sufficient hardware elements 400 and software elements 402 to perform the operations described herein.

In addition, although FIG. 4 is presented as an example, FIG. 4 is simplified for clarity and brevity. In some implementations, electronic device 434 includes more applications. In addition, in some implementations, there are additional between the elements and/or other interactions between the elements, such as interactions between BIOS 426 and operating system 424 during a startup of electronic device 434, etc. Generally, in the described implementations, an electronic device includes sufficient hardware and software elements to enable the operations herein described.

Figure 5:
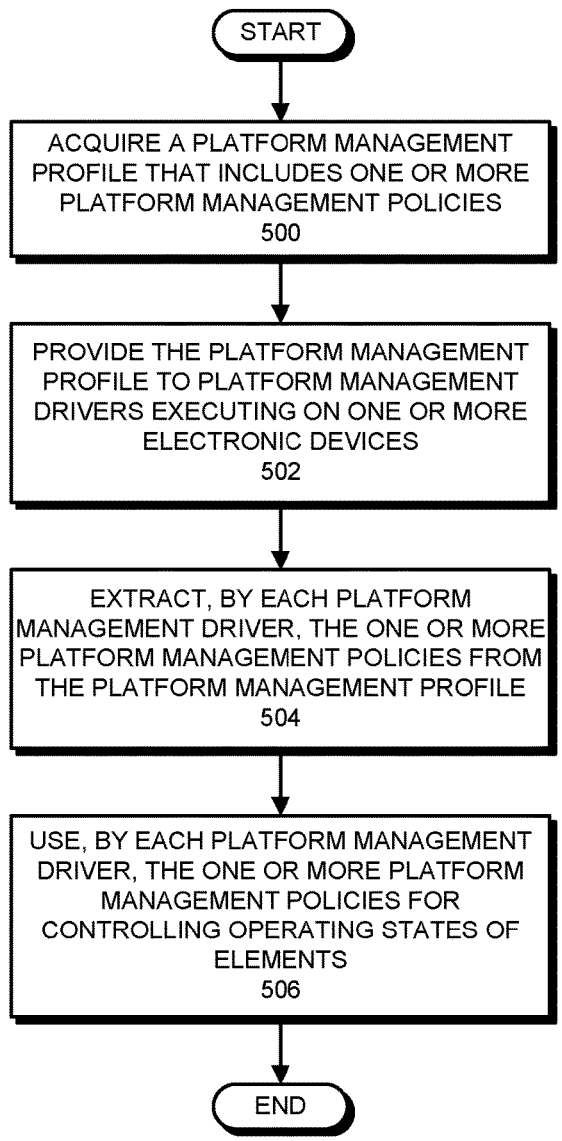
FIG. 5 presents a flowchart illustrating a process for providing policy header files to electronic devices in accordance with some implementations.

In the described implementations, an installing electronic device provides, to one or more target electronic devices (and possibly a large number of target electronic devices), a policy header file including one or more platform management profiles that are used by platform management drivers executing on the target electronic devices for controlling operation of elements (e.g., functional block 404, device 406, fan 408, etc.) for the target electronic devices. FIG. 5 presents a flowchart illustrating a process for providing policy header files to electronic devices in accordance with some implementations. FIG. 5 is presented as a general example of operations performed in some implementations. In other implementations, however, different operations are performed and/or operations are performed in a different order. Additionally, although certain elements are described as performing operations for the process, in some implementations, other elements perform the operations.

For the example in FIG. 5, an "installing" electronic device is described as providing a platform management profile to a "target" electronic device. Although an implementation is described in which the installing electronic device and the target electronic device are separate devices, in some implementations, the installing electronic device and the target electronic device are the same device. For example, a user can generate platform management profiles (e.g., via a user interface, etc.) on an electronic device that is to use the platform management profiles as described herein. In these implementations, the acquiring and providing steps 500-502 are performed on the same electronic device that will be using the platform management profile.

As can be seen in FIG. 5, the process starts when an installing electronic device acquires a platform management profile that includes one or more platform management policies (step 500). For this operation, the installing electronic device acquires the platform management profile (e.g., platform management profile 202) by receiving the platform management profile via a user interface (as described below for FIGS. 9-10), reading the platform management profile from a memory, receiving the platform management profile via a network interface, etc. The installing electronic device then provides the platform management profile to platform management drivers executing on one or more target electronic devices (step 502). For this operation, the installing electronic device makes the platform management profile available to the platform management drivers on each of the electronic device. For example, the installing electronic device can incorporate the platform management profile into a policy header file that is compiled into BIOS files for each target electronic device. As another example, the installing electronic device can incorporate the platform management profile into a policy header file that is communicated to the platform management drivers via a policy management application executing on the target electronic devices.

The platform management driver on each target electronic device then extracts one or more platform management policies from the platform management profiles (step 504). For this operation, each platform management driver acquires (from the BIOS files) or receives (from the policy management application) the policy header file and reads the platform management profiles from the policy header file. The platform management driver then reads the individual platform management policies from the platform management profile. Recall that platform management policies are listings, records, and/or other identifiers for determining when a specified output action and/or provided output action is to be taken or performed based on one or more inputs and/or provided inputs meeting an indicated condition. When reading each of the platform management policies, therefore, the platform management drivers read input information that identifies one or more inputs and/or provided inputs for that platform management policy; condition information that identifies one or more conditions for or associated with the one or more inputs and/or provided inputs; and output action and/or provided output action information identifying one or more output actions to be performed by a given platform management driver for controlling operating states of elements when the one or more conditions are met by the one or more inputs and/or provided inputs.

The platform management driver then uses the one or more platform management policies for controlling operating states of elements on the respective target electronic device (step 506). For this operation, the platform management driver receives, from hardware and/or software sensors (e.g., hardware sensors 420 and software sensors 422) values for the inputs and/or provided inputs for each platform management policy. The platform management driver then uses one or more conditions associated with each platform management policy to determine whether (or what) output action and/or provided output action is to be taken or performed. For example, the inputs for a platform management policy can include a given software application (e.g., a video player application, a productivity application, etc.) being executed and a time of day, and the condition can be that both of these inputs are to be true. In this case, when the platform management driver finds the inputs to be true (i.e., the given software application is executing and it is the time of day), the platform management driver performs a corresponding output action and/or provided output action (e.g., computer speakers can be reduced in volume, display brightness can be adjusted, processor performance can be increased, network interface speed can be increased, software applications can be executed, etc.). As another example, the inputs can include ambient sound in an environment around the target electronic device and the condition can be the sound being lower than a given threshold. In this case, when the platform management driver finds the input to be true (i.e., the ambient sound is below the threshold, such as when a laptop computer is being used in a quiet environment such as a library or classroom), the platform management driver performs a corresponding output action and/or provided output action (e.g., decreases element performance levels to avoid the generation of heat, lowers fan speeds, halts unused disk drives, mutes alert sounds, etc.). In this way, the platform management driver on each of the target devices controls operating states of elements on the target device based on the platform management policies found in the platform management profile. Note that controlling operating states of "elements," as described herein, can include controlling operating states of individual elements (e.g., individual functional blocks, devices, fans, etc.) or groups of elements.

Figure 6:
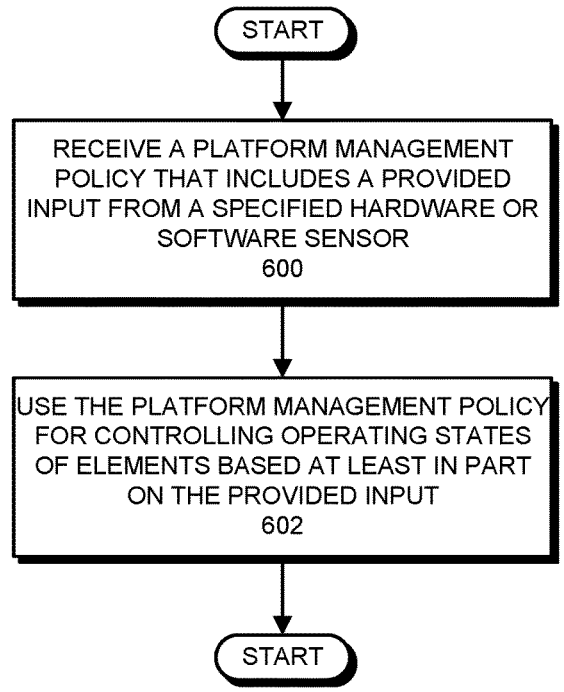
FIG. 6 presents a flowchart illustrating a process for using provided inputs in platform management policies in accordance with some implementations.

In the described implementations, platform management drivers executed by electronic devices use platform management policies that include provided inputs for controlling operation of elements (e.g., functional blocks, devices, etc.) for the electronic devices. FIG. 6 presents a flowchart illustrating a process for using provided inputs in a platform management policy in accordance with some implementations. FIG. 6 is presented as a general example of operations performed in some implementations. In other implementations, however, different operations are performed and/or operations are performed in a different order. Additionally, although certain elements are used in describing the processes, in some implementations, other elements perform the operations.

For the example in FIG. 6, it is assumed that a platform management policy includes only a single provided input and no other inputs (i.e., no non-provided inputs, which are inputs that are known to the platform management driver). In some implementations, however, the platform management policy can include two or more provided inputs and/or a combination of provided inputs and other inputs. Generally, in the described implementations, platform management policies can include any combination of provided inputs and other inputs.

As can be seen in FIG. 6, the process starts when a platform management driver executing on an electronic device (e.g., a target electronic device such as electronic device 434) receives a platform management policy that includes a provided input from a specified hardware or software sensor (step 600). For this operation, the platform management driver acquires (from the BIOS files) or receives (from the policy management application) a policy header file and reads a platform management profile from the policy header file. The platform management driver then reads the platform management policy from the platform management profile. Recall that platform management policies are listings, records, and/or other identifiers for determining when specified output actions are to be taken or performed based on one or more inputs and/or provided inputs meeting indicated conditions. When reading the platform management policy, therefore, the platform management driver reads provided input information that identifies the provided input; condition information that identifies one or more conditions for or associated with the provided input; and output action information identifying one or more output actions/provided output actions to be performed by a given platform management driver for controlling operating states of elements when the provided input meets the one or more conditions. Recall that a provided input is an input to the platform management driver that is unknown to the platform management driver—and may be from a hardware or software sensor that is itself unknown to the platform management driver.

Figure 7:
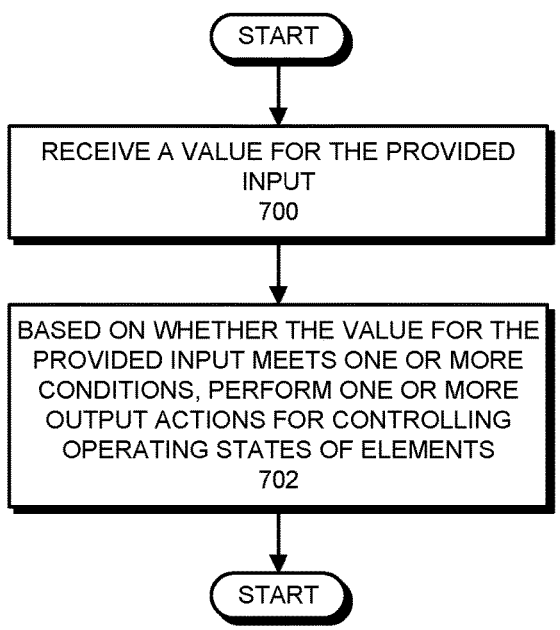
FIG. 7 presents a flowchart illustrating a process for controlling operating states of elements in an electronic device using provided inputs in platform management policies in accordance with some implementations.

The platform management driver then uses the platform management policy for controlling operating states of elements in the electronic device based at least in part on the provided input (step 602). For this operation, the platform management driver determines whether the provided input meets the one or more conditions from the platform management policy and performs corresponding output actions and/or provided output actions for controlling the operating states of the elements. FIG. 7 presents a flowchart illustrating a process for controlling operating states of elements using a provided input in accordance with some implementations. FIG. 7 is presented as a general example of operations performed in some implementations. In other implementations, however, different operations are performed and/or operations are performed in a different order. Additionally, although certain elements are used in describing the processes, in some implementations, other elements perform the operations. As can be seen in FIG. 7, the process starts when a platform management driver receives a value for a provided input (step 700). For this operation, the platform management driver receives the value for the provided input from a software entity (e.g., a software sensor 422, operating system 424, BIOS 426, etc.) or a hardware functional block or device (e.g., hardware sensors 420, platform management firmware 416, etc.). For example, assuming that the provided input is an output from an operating system (i.e., a software sensor) that identifies whether (or not) a given software application is presently executing on the electronic device (e.g., video conferencing software, media player software, etc.), the platform management driver can receive the output from the operating system. Recall that the platform management driver receives the value for the provided input in a specified format (e.g., a doubleword, etc.). Based on whether the value for the provided input meets one or more conditions from the platform management policy, the platform management driver performs one or more output actions and/or provided output actions for controlling operating states of elements (step 702). Continuing the example, the platform management driver can determine, based on the output from the operating system, whether the given software application is presently executing. When the given software application is presently executing (or not presently executing), the platform management driver can perform one or more output actions and/or provided output actions for controlling operating states of elements in the electronic device. For example, the platform management driver can increase the brightness of a display, increase network interface bandwidth, place a processor in a higher power operating mode, etc.

Figure 8:
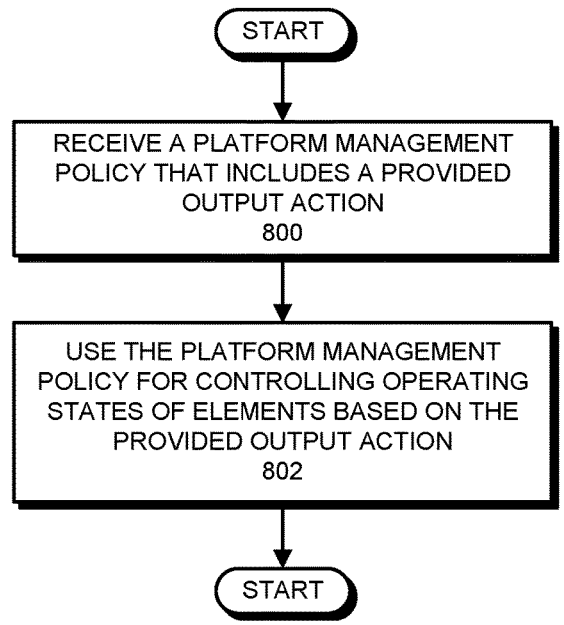
FIG. 8 presents a flowchart illustrating a process for controlling operating states of elements in an electronic device using provided output actions in a platform management policy in accordance with some implementations.

In the described implementations, platform management drivers executed by electronic devices use platform management policies that include provided output actions for controlling operation of elements (e.g., functional blocks, devices, etc.) for the electronic devices. FIG. 8 presents a flowchart illustrating a process for controlling operating states of elements in an electronic device using provided output actions in a platform management policy in accordance with some implementations. FIG. 8 is presented as a general example of operations performed in some implementations. In other implementations, however, different operations are performed and/or operations are performed in a different order. Additionally, although certain elements are used in describing the processes, in some implementations, other elements perform the operations.

For the example in FIG. 8, it is assumed that a platform management policy includes only a single provided output action and no other output action (i.e., no non-provided output actions, i.e., output actions that are known to the platform management driver). In some implementations, however, the platform management policy can include two or more provided output actions and/or a combination of provided output actions and other output actions. Generally, in the described implementations, platform management policies can include any combination of provided output actions and other output actions.

As can be seen in FIG. 8, the process starts when a platform management driver executing on an electronic device (e.g., a target electronic device such as electronic device 434) receives a platform management policy that includes a provided output action (step 800). For this operation, the platform management driver acquires (from the BIOS files) or receives (from the policy management application) a policy header file and reads a platform management profile from the policy header file. The platform management driver then reads the platform management policy from the platform management profile. Recall that platform management policies are listings, records, and/or other identifiers for determining when specified output actions and/or provided output actions are to be taken or performed based on one or more inputs and/or provided inputs meeting indicated conditions. When reading the platform management policy, therefore, the platform management driver reads input information that identifies the inputs and/or provided inputs; condition information that identifies one or more conditions for or associated with the inputs and/or provided inputs; and provided output action information identifying the provided output action to be performed by a given platform management driver for controlling operating states of elements when the inputs and/or provided inputs meet the one or more conditions. Recall that a provided output action is an output action to be performed by the platform management driver that is unknown to the platform management driver (in the sense that the platform management driver does not itself include information other than the platform management policy that characterizes or otherwise identifies the provided output action).

The platform management driver then uses the platform management policy for controlling operating states of elements in the electronic device based on the provided output action (step 802). For this operation, the platform management driver determines whether the inputs and/or provided inputs meet the one or more conditions from the platform management policy and performs the provided output action for controlling the operating states of the elements. For example, assuming that a provided input is an output from an operating system (i.e., a software sensor) that identifies whether (or not) a given software application is presently executing on the electronic device (e.g., video conferencing software, media player software, etc.), the platform management driver can receive the output from the operating system. The platform management driver can then determine, based on the output from the operating system, whether the given software application is presently executing. When the given software application is presently executing (or not presently executing), the platform management driver can perform the provided output actions for hardware and/or software entities on the electronic device. For example, the platform management driver can increase the brightness of a display, increase network interface bandwidth, place a processor in a higher power operating mode, mute other applications or notifications therefrom, adjust a resolution of video played by an application, disable background applications in the operating system, etc.

Figure 9:
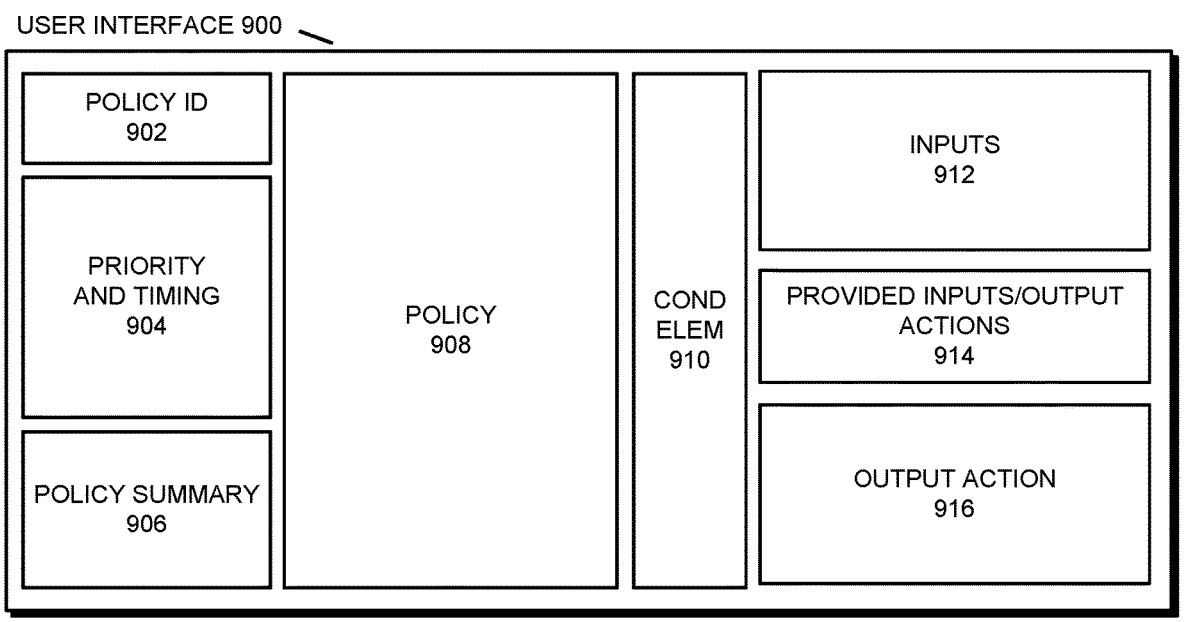
FIG. 9 presents a block diagram illustrating a user interface in accordance with some implementations.
Figure 10:
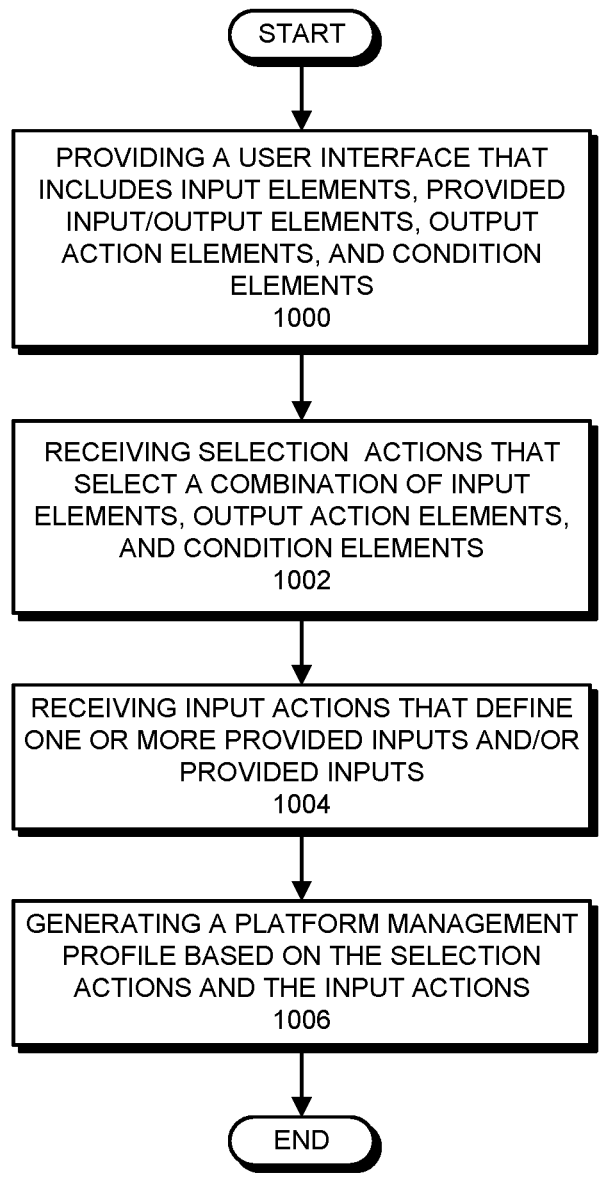
FIG. 10 presents a flowchart illustrating a process for using a user interface in accordance with some implementations.

In some implementations, an electronic device (e.g., a policy management application executed by a processor on an installing electronic device, etc.) provides a graphical user interface that includes a number of elements for creating platform management profiles and the platform management policies included therein. FIG. 9 presents a block diagram illustrating a user interface for generating a platform management profile (and/or platform management policies) in accordance with some implementations. FIG. 10 presents a flowchart illustrating a process for using a user interface for generating a platform management profile (and/or platform management policies) in accordance with some implementations. FIGS. 9-10 are presented as general examples of a user interface and operations performed in some implementations. In other implementations, however, the user interface includes different elements and/or is differently arranged. In addition, in some implementations, different operations are performed and/or operations are performed in a different order. Additionally, although certain elements are used in describing FIGS. 9-10, in some implementations, other elements are used.

As can be seen in FIG. 9, user interface 900 includes policy identifier (ID) 902, priority and timing 904, policy summary 906, policy 908, conditional elements (ELEM) 910, inputs 912, provided inputs/output actions 914, and output actions 916. Generally, the elements in user interface 900 include graphical elements that describe a platform management profile and/or platform management policy being created and enable a user to easily point and click (e.g., using a mouse pointer, a stylus, etc.) for selecting elements for defining a platform management profile and/or platform management policy. Policy identifier 902 is an element that includes information about a platform management profile and/or platform management policy that is being created (e.g., a name, a size, a date, a compatibility, a version, a target electronic device identifier, etc.). Priority and timing 904 is an element that includes information about a timing when the platform management profile and/or platform management policy is to be used by a target device (e.g., a time during the day or night when the platform management profile and/or platform management policy will be in effect) and/or a priority of the platform management profile and/or platform management policy with regard to a preset specification of priorities for platform management profiles and/or platform management policies. In some implementations, priority and timing 904 includes selectable graphical elements (e.g., radio buttons, text entry boxes, sliders, text labels, etc.) for defining the timing and/or priority of the platform management profile and/or platform management policy. Policy summary 906 is an element that includes information summarizing the platform management profile and/or platform management policy, e.g., times of day/night the platform management profile and/or platform management policy will be in effect, etc.

Policy 908 is an element that includes a graphical depiction of the platform management profile and/or platform management policy being created. In some implementations, policy 908 starts with basic/general information about the platform management profile and/or platform management policy being created. As various inputs, conditions, and output actions are added to each platform management profile and/or platform management policy, the information displayed in policy 908 is updated so that the user can readily envision what inputs, conditions, and output actions will be used—and how they will be used—for the platform management profile and/or platform management policy being created. For example, in some implementations, inputs and/or provided inputs are displayed in a first portion of policy 908 (e.g., in inputs and/or provided inputs boxes or other graphical elements within policy 908), conditions are displayed in a second portion of policy 908, and output actions and/or provided output actions are displayed in a third portion of policy 908. In some implementations, inputs/provided inputs, conditions, and output actions/provided output actions are displayed in a format similar to a mathematical equation for each platform management policy. In some implementations, the inputs/provided inputs, conditions, and/or output actions/provided output actions displayed in policy 908 are selectable/can be selected and can have operations performed on them, e.g., deletion, copying, organizing, defining, etc.

Conditional elements 910 is an element that includes graphical elements representing conditions that can be included in platform management profiles and/or platform management policies being created. For example, in some implementations, the graphical elements include some or all of comparison elements for comparing values (e.g., a> or <sign, etc.), equivalency elements for testing equivalency of values (e.g., an=sign, etc.), and ordering or grouping elements for identifying orders in which values are compared or tested (e.g., brackets or parentheses, etc.). In some implementations, the graphical elements can be selected to add the corresponding condition to a platform management profile and/or platform management policy being created. For example, a comparison element can be selected to add a comparison of an input/provided input to a specified value, other input/provided input, etc. to a platform management profile and/or platform management policy being created.

Inputs 912 is an element that includes graphical elements representing the inputs (e.g., hardware and software sensor values) available for use in platform management profiles and/or platform management policies being created. For example, in some implementations, the graphical elements include a listing of each hardware and/or software sensor and/or the sensor data output therefrom. In some implementations, the graphical elements can be selected to add the corresponding input to a platform management profile and/or platform management policy being created.

Provided inputs/output actions 914 is an element that includes graphical elements to be used for inputting information about provided inputs (e.g., names, identifiers, source hardware or software sensor, port numbers, memory locations, etc.) and/or provided output actions (i.e., hardware or software entity identifiers, command information, etc.) for use in platform management policies and/or platform management profiles being created. For example, in some implementations, provided inputs/output actions 914 includes text boxes, selectable elements identifying hardware and/or software sensors, etc. that can be used for inputting information about provided inputs and/or text boxes, selectable elements identifying output actions, etc. that can be used for inputting information about provided output actions. Generally, provided inputs/output actions 914 includes sufficient input elements to enable the entry of information about provided inputs and/or provided output actions for creating a platform management profile and/or platform management policy to enable a platform management driver that uses the platform management profile and/or platform management policy to identify the provided input and/or provided output action.

Output action 916 is an element that includes graphical elements representing the output actions available for use in platform management profiles and/or platform management policies being created. For example, in some implementations, the graphical elements include a listing of each setting for operating states of elements (e.g., functional blocks, devices, etc.) that can be adjusted/changed by the platform management driver (directly or indirectly via another functional block or software entity). In some implementations, the graphical elements can be selected to add the corresponding output action to a platform management profile and/or platform management policy being created. In other words, when creating a given platform management profile and/or platform management policy, the graphical elements can be selected to add the respective output action to the given platform management profile and/or platform management policy.

FIG. 10 presents a flowchart illustrating a process for using a user interface for generating a platform management profile in accordance with some implementations. FIG. 10 is presented as a general example of operations performed in some implementations. In other implementations, however, different operations are performed and/or operations are performed in a different order. Additionally, although certain elements are used in describing the processes, in some implementations, other elements perform the operations. As can be seen in FIG. 10, the process starts when an electronic device provides a user interface (e.g., user interface 900) that includes input elements, provided input/output action elements, output action elements, and condition elements (step 1000). The electronic device then receives selection actions (e.g., point and click, text entry, hotkey presses, etc.) that select a combination of input elements, output action elements, and condition elements (step 1002). For example, a user can hover a mouse over a selectable graphical element (e.g., a radio button with a corresponding label) and click to select the graphical element—i.e., the input elements, output action elements, and condition elements represented by the graphical element. The electronic device may also receive input actions (e.g., information entry into input graphical elements) that define one or more provided inputs (step 1004). Alternatively, the electronic device can receive only input actions defining provided inputs and no selection actions selecting inputs or input actions defining provided output actions and no selection actions selecting output actions—or vice versa (i.e., a platform management profile and/or platform management policy can have one or both inputs and provided inputs and/or outputs and/or provided action outputs). The electronic device then generates a platform management profile based on the selection and input actions (step 1006). For this operation, the electronic device generates a platform management profile (e.g., platform management profile 202) as described herein.

In some implementations, at least one electronic device (e.g., electronic device 100, etc.) or some portion thereof uses code and/or data stored on a non-transitory computer-readable storage medium to perform some or all of the operations described herein. More specifically, the at least one electronic device reads code and/or data from the computer-readable storage medium and executes the code and/or uses the data when performing the described operations. A computer-readable storage medium can be any device, medium, or combination thereof that stores code and/or data for use by an electronic device. For example, the computer-readable storage medium can include, but is not limited to, volatile and/or non-volatile memory, including flash memory, random access memory (e.g., DDR5 DRAM, SRAM, eDRAM, etc.), non-volatile RAM (e.g., phase change memory, ferroelectric random access memory, spin-transfer torque random access memory, magnetoresistive random access memory, etc.), read-only memory (ROM), and/or magnetic or optical storage mediums (e.g., disk drives, magnetic tape, CDs, DVDs, etc.).

In some implementations, one or more hardware modules perform the operations described herein. For example, the hardware modules can include, but are not limited to, one or more central processing units (CPUs)/CPU cores, graphics processing units (GPUs)/GPU cores, application-specific integrated circuit (ASIC) chips, field-programmable gate arrays (FPGAs), compressors or encoders, encryption functional blocks, compute units, embedded processors, accelerated processing units (APUs), controllers, requesters, completers, network communication links, and/or other functional blocks and elements. When circuitry (e.g., integrated circuit elements, discrete circuit elements, etc.) in such hardware modules is activated, the circuitry performs some or all of the operations. In some implementations, the hardware modules include general purpose circuitry such as execution pipelines, compute or processing units, etc. that, upon executing instructions (e.g., program code, firmware, etc.), performs the operations. In some implementations, the hardware modules include purpose-specific or dedicated circuitry that performs the operations "in hardware" and without executing instructions.

In some implementations, a data structure representative of some or all of the functional blocks and circuit elements described herein (e.g., electronic device 100 or some portion thereof) is stored on a non-transitory computer-readable storage medium that includes a database or other data structure which can be read by an electronic device and used, directly or indirectly, to fabricate hardware including the functional blocks and circuit elements. For example, the data structure may be a behavioral-level description or register-transfer level (RTL) description of the hardware functionality in a high-level design language (HDL) such as Verilog or VHDL. The description may be read by a synthesis tool which may synthesize the description to produce a netlist including a list of transistors/circuit elements from a synthesis library that represent the functionality of the hardware including the above-described functional blocks and circuit elements. The netlist may then be placed and routed to produce a data set describing geometric shapes to be applied to masks. The masks may then be used in various semiconductor fabrication steps to produce a semiconductor circuit or circuits (e.g., integrated circuits) corresponding to the above-described functional blocks and circuit elements. Alternatively, the database on the computer accessible storage medium may be the netlist (with or without the synthesis library) or the data set, as desired, or Graphic Data System (GDS) II data.

In this description, variables or unspecified values (i.e., general descriptions of values without particular instances of the values) are represented by letters such as N, T, and X As used herein, despite possibly using similar letters in different locations in this description, the variables and unspecified values in each case are not necessarily the same, i.e., there may be different variable amounts and values intended for some or all of the general variables and unspecified values. In other words, particular instances of N and any other letters used to represent variables and unspecified values in this description are not necessarily related to one another.

The expression "et cetera" or "etc." as used herein is intended to present an and/or case, i.e., the equivalent of "at least one of" the elements in a list with which the etc. is associated. For example, in the statement "the electronic device performs a first operation, a second operation, etc.," the electronic device performs at least one of the first operation, the second operation, and other operations. In addition, the elements in a list associated with an etc. are merely examples from among a set of examples—and at least some of the examples may not appear in some implementations.

The foregoing descriptions of implementations have been presented only for purposes of illustration and description. They are not intended to be exhaustive or to limit the implementations to the forms disclosed. Accordingly, many modifications and variations will be apparent to practitioners skilled in the art. Additionally, the above disclosure is not intended to limit the implementations. The scope of the implementations is defined by the appended claims.

What is claimed is:

1. A method, comprising:
   receiving, by a platform management driver executed by an electronic device, a platform management profile that includes information defining one or more platform management policies, a given platform management policy among the one or more platform management policies including at least one of a provided input from a specified hardware or software sensor and a provided output action, wherein the provided input and/or provided output action is unknown to the platform management driver prior to the platform management driver receiving the platform management profile; and
   using, by the platform management driver, the given platform management policy for controlling operating states of elements in the electronic device.

2. The method of claim 1, wherein using, by the platform management driver, the given platform management policy includes using the provided input and/or provided output action for controlling the operating states of the elements.

3. The method of claim 2, wherein using the provided input includes:
   receiving a value for the provided input; and
   based on whether the value for the provided input meets one or more conditions identified in the given platform management policy, performing one or more output actions and/or provided output actions identified in the given platform management policy for controlling the operating states of the elements.

4. The method of claim 3, further comprising:
   receiving the value for the provided input in a predetermined format, the predetermined format being a particular type or arrangement of data.

5. The method of claim 3, wherein receiving the value for the provided input includes:
   receiving the value for the provided input from basic input output system (BIOS) program code executed by the electronic device, the value for the provided input having been acquired from the specified hardware and/or software sensor by the BIOS program code.

6. The method of claim 5, further comprising:
   providing, by the platform management driver, an input interface; and
   receiving, by the platform management driver, the value for the provided input from the BIOS program code via the input interface.

7. The method of claim 2, wherein using the provided output action includes:
   when an input and/or a provided input meet one or more conditions identified in the given platform management policy, performing the provided output action to control the operating states of the elements.

8. The method of claim 1, wherein receiving the platform management profile includes:
   reading, from one or more BIOS files acquired from a memory element, a policy header file that includes the platform management profile, the policy header file having been compiled into the BIOS files; or
   receiving, from a policy management application executed by the electronic device, a policy header file that includes the platform management profile; and
   extracting the platform management profile from policy header file.

9. The method of claim 1, further comprising:
   presenting, by a policy management application executed by the electronic device, a user interface that includes input elements representing available inputs, provided input elements for inputting information defining provided inputs, output action elements representing available output actions, provided output action elements for inputting information defining provided output actions, and condition elements representing conditions under which values for the inputs and/or provided inputs are to cause respective output actions and/or provided output actions;

receiving selections and/or inputs via the user interface, the selections selecting input elements, output action elements, and/or condition elements, and the inputs defining provided inputs and/or provided output actions; and generating the platform management profile based at least in part on the selections and the inputs.

10. The method of claim 1, wherein each of the platform management policies includes:

input information that identifies one or more inputs and/or provided inputs for that platform management policy;

condition information that identifies one or more conditions for or associated with the one or more inputs and/or provided inputs; and output action information identifying one or more output actions and/or provided output actions to be performed by the platform management driver for controlling operating states of the elements when the one or more inputs and/or provided inputs meet the one or more conditions.

11. The method of claim 1, wherein the elements include functional blocks and/or devices in the electronic device.

12. An electronic device, comprising:

a memory; and a processor, the processor configured to perform operations of a platform management driver, the operations including:

receiving a platform management profile that includes information defining one or more platform management policies, a given platform management policy among the one or more platform management policies including at least one of a provided input from a specified hardware or software sensor and a provided output action, wherein the provided input and/or provided output action is unknown to the platform management driver prior to being received in the platform management profile; and using the given platform management policy for controlling operating states of elements in the electronic device.

13. The electronic device of claim 12, wherein when using the given platform management policy, the processor is configured to:

use the provided input and/or provided output action for controlling the operating states of the elements.

14. The electronic device of claim 13, wherein, when using the provided input, the processor is configured to:

receive a value for the provided input; and based on whether the value for the provided input meets one or more conditions identified in the given platform management policy, perform one or more output actions and/or provided output actions identified in the given platform management policy for controlling the operating states of the elements.

15. The electronic device of claim 14, wherein the processor is configured to:

receive the value for the provided input in a predetermined format, the predetermined format being a particular type or arrangement of data.

16. The electronic device of claim 14, wherein, when receiving the value for the provided input, the processor is configured to:

receive the value for the provided input from basic input output system (BIOS) program code, the value for the provided input having been acquired from the specified hardware and/or software sensor by the BIOS program code.

17. The electronic device of claim 13, wherein, when using the provided output action, the processor is configured to:

when an input and/or a provided input meet one or more conditions identified in the given platform management policy, perform the provided output action to control the operating states of the elements.

18. The electronic device of claim 12, wherein each of the platform management policies includes:

input information that identifies one or more inputs and/or provided inputs for that platform management policy;

condition information that identifies one or more conditions for or associated with the one or more inputs and/or provided inputs; and output action information identifying one or more output actions and/or provided output actions to be performed by the platform management driver for controlling operating states of the elements when the one or more inputs and/or provided inputs meet the one or more conditions.

* * * * *